(12) United States Patent
Dawson-Elli (10) Patent No.: US 11,529,792 B2
(45) Date of Patent: Dec. 20, 2022

(54) GLASS LAMINATES HAVING A CONTROLLED COEFFICIENT OF THERMAL EXPANSION AND METHODS FOR MAKING THE SAME

(71) Applicant: Corning Incorporated, Corning, NY (US)

(72) Inventor: David Francis Dawson-Elli, Dundee, NY (US)

(73) Assignee: Corning Incorporated, Corning, NY (US)

( * ) Notice: Subject to any disclaimer, the term of this patent is extended or adjusted under 35 U.S.C. 154(b) by 1079 days.

(21) Appl. No.: 16/096,187

(22) PCT Filed: May 9, 2017

(86) PCT No.: PCT/US2017/031684
§ 371 (c)(1),
(2) Date: Oct. 24, 2018

(87) PCT Pub. No.: WO2017/196800
PCT Pub. Date: Nov. 16, 2017

(65) Prior Publication Data
US 2019/0134944 A1    May 9, 2019

Related U.S. Application Data (60) Provisional application No. 62/333,394, filed on May 9, 2016.

(51) Int. Cl.
*B32B 7/027*    (2019.01)
*B32B 17/06*    (2006.01)
(Continued)

(52) U.S. Cl.
CPC .............. *B32B 7/027* (2019.01); *B32B 17/06* (2013.01); *B32B 17/061* (2013.01);
(Continued)

(58) Field of Classification Search
CPC .......... B32B 7/00–7/14; B32B 17/00–17/1099
See application file for complete search history.

(56) References Cited

U.S. PATENT DOCUMENTS

| 3,958,052 A | 5/1976 | Galusha et al. |
| 2012/0017975 A1 | 1/2012 | Giron et al. |

(Continued)

FOREIGN PATENT DOCUMENTS

| CN | 101219853 A | 7/2008 |
| CN | 102300820 A | 12/2011 |

(Continued)

OTHER PUBLICATIONS

International Search Report and Written Opinion of the International Searching Authority; PCT/US2017/031684; dated Jul. 17, 2017; 11 Pages; European Patent Office.

(Continued)

*Primary Examiner* — Prashant J Khatri
(74) *Attorney, Agent, or Firm* — Amy T. Lang; John P. McGroarty (57) ABSTRACT

Apparatuses and methods for glass laminates having a controlled coefficient of thermal expansion are disclosed. In C one embodiment, a glass laminate includes a glass core having a core thickness ($T_{core}$) and a core coefficient of thermal expansion ($CTE_{core}$), a first glass cladding layer and a second glass cladding layer. The first glass cladding layer and the second glass cladding layer are arranged such that the glass core is disposed between the first glass cladding layer and the second glass cladding layer. The first glass cladding layer has a first cladding thickness ($T_{clad1}$) and a first clad coefficient of thermal expansion ($CTE_{clad1}$), and the second glass cladding layer has a second cladding thickness ($T_{clad2}$) and a second clad coefficient of thermal expansion ($CTE_{clad2}$). The glass laminate has a laminate coefficient of thermal expansion ($CTE_L$) within a range of (Continued)

about $35\times10^{-7}/°$ C. to about $90\times10^{-7}/°$ C., the laminate coefficient of thermal expansion ($CTE_L$) defined by: $CTE_L = ((CTE_{core} \times T_{core}) + (CTE_{clad1} \times T_{clad1}) + (CTE_{clad2} \times T_{clad2}))/(T_{core} + T_{clad1} + T_{clad2})$.

9 Claims, 4 Drawing Sheets

(51) Int. Cl.
  *B32B 17/10* (2006.01)
  *C03B 23/203* (2006.01)
  *C03C 15/00* (2006.01)
  *C03C 23/00* (2006.01)
(52) U.S. Cl.
  CPC .... *B32B 17/10045* (2013.01); *B32B 17/1077* (2013.01); *B32B 17/10119* (2013.01); *B32B 17/10761* (2013.01); *B32B 17/10788* (2013.01); *B32B 17/10834* (2013.01); *B32B 17/10935* (2013.01); *C03B 23/203* (2013.01); *C03C 15/00* (2013.01); *C03C 23/0075* (2013.01); *B32B 2457/14* (2013.01)

(56) References Cited

U.S. PATENT DOCUMENTS

| | | |
|---|---|---|
| 2012/0192928 A1 | 8/2012 | Krol et al. |
| 2013/0241841 A1 | 9/2013 | Orsley |
| 2014/0127857 A1 | 5/2014 | Chen et al. |
| 2014/0138420 A1 | 5/2014 | Peng et al. |
| 2014/0141217 A1* | 5/2014 | Gulati .................... C03B 23/20 428/212 |
| 2015/0132538 A1 | 5/2015 | Cleary et al. |

FOREIGN PATENT DOCUMENTS

| | | |
|---|---|---|
| EP | 0512401 A2 | 11/1992 |
| WO | 2008150355 A1 | 12/2008 |
| WO | WO-2014160534 A1 * | 10/2014 ............. C03C 3/093 |
| WO | 2015148618 A1 | 10/2015 |

OTHER PUBLICATIONS

Chinese Patent Application No. 201780028923.X, Office Action dated Nov. 26, 2020; 5 pages; Chinese Patent Office.

* cited by examiner

GLASS LAMINATES HAVING A CONTROLLED COEFFICIENT OF THERMAL EXPANSION AND METHODS FOR MAKING THE SAME

CROSS-REFERENCE TO RELATED APPLICATIONS

This application claims the benefit of priority under 35 U.S.C. § 371 of International Application No. PCT/US2017/031684, filed on May 9, 2017, which claims the benefit of priority to U.S. Provisional Application No. 62/333,394 filed on May 9, 2016, the content of which is incorporated herein by reference in its entirety.

BACKGROUND

Field

The present specification generally relates to glass laminates, and more specifically, to glass laminates having a controlled coefficient of thermal expansion and their methods of fabrication.

Technical Background

Glass wafers may be used as carriers for silicon wafers for the production of integrated circuits. Silicon wafers are disposed on the glass wafers and then backgrinded to a desired thickness. During wafer backgrinding, the thickness of the silicon wafer is reduced to allow for stacking and high density packaging of integrated circuits. While making such integrated circuits, it may be important that the coefficient of thermal expansion of the glass wafer matches the net coefficient of thermal expansion of the silicon wafer.

Glass wafers may be produced using down draw methods, such as fusion draw. In order to match the coefficient of thermal expansion of the glass wafer to the targeted coefficient of thermal expansion, the composition of glass used in the fusion draw process must change to match the coefficient of thermal expansion of the silicon wafer. However, because the volume of glass obtained from the fusion draw process is significantly higher than the current volume and variety of coefficient of thermal expansion requested for glass wafers for use as silicon wafer carriers, a composition change of glass in the fusion draw process may be an impractical solution. Additionally, it may be complicated to change the composition of glass to produce a glass wafer that matches the net coefficient of thermal expansion of the silicon wafer. For these, and other reasons, it has been challenging to obtain glass wafers for use as carriers for silicon wafers, where the carriers achieve a variety of specific coefficients of thermal expansion (i.e., multiple products, each with a different coefficient of thermal expansion).

Accordingly, a need exists for alternative apparatuses and methods for making glass wafers used as carriers for silicon wafers, with a designed and specified coefficient of thermal expansion.

SUMMARY

According to one embodiment, a glass laminate includes a glass core having a core thickness ($T_{core}$) and a core coefficient of thermal expansion ($CTE_{core}$), and a first glass cladding layer and a second glass cladding layer. The first glass cladding layer and the second glass cladding layer are arranged such that the glass core is disposed between the first glass cladding layer and the second glass cladding layer. The first glass cladding layer has a first cladding thickness ($T_{clad1}$) and a first clad coefficient of thermal expansion ($CTE_{clad1}$), and the second glass cladding layer has a second cladding thickness ($T_{clad2}$) and a second clad coefficient of thermal expansion ($CTE_{clad2}$). The glass laminate has a laminate coefficient of thermal expansion ($CTE_L$) within a range of about $35 \times 10^{-7}/°$ C. to about $90 \times 10^{-7}/°$ C., the laminate coefficient of thermal expansion ($CTE_L$) defined by: $CTE_L = ((CTE_{core} \times T_{core}) + (CTE_{clad1} \times T_{clad1}) + (CTE_{clad2} \times T_{clad2}))/(T_{core} + T_{clad1} + T_{clad2})$.

In another embodiment, a method of making a glass laminate having a laminate coefficient of thermal expansion ($CTE_L$) includes bonding a first core surface of a glass core with a first clad surface of a first cladding glass, bonding a second core surface of the glass core with the third clad surface of a second cladding glass to form the glass laminate. The glass laminate includes the glass core having a core thickness ($T_{core}$) and a core coefficient of thermal expansion ($CTE_{core}$), a first glass cladding layer and a second glass cladding layer. The first glass cladding layer has a first cladding thickness ($T_{clad1}$) and a first clad coefficient of thermal expansion ($CTE_{clad1}$), and the second glass cladding layer has a second cladding thickness ($T_{clad2}$) and a second clad coefficient of thermal expansion ($CTE_{clad2}$). The laminate coefficient of thermal expansion ($CTE_L$) is defined by: $CTE_L = ((CTE_{core} \times T_{core}) + (CTE_{clad1} \times T_{clad1}) + (CTE_{clad2} \times T_{clad2}))/(T_{core} + T_{clad1} + T_{clad2})$, where the core thickness ($T_{core}$), the core coefficient of thermal expansion ($CTE_{core}$), the first cladding thickness ($T_{clad1}$) and the first clad coefficient of thermal expansion ($CTE_{clad1}$), the second cladding thickness ($T_{clad2}$) and the second clad coefficient of thermal expansion ($CTE_{clad2}$) are such that the glass laminate has the laminate coefficient of thermal expansion ($CTE_L$) within a range of about $35 \times 10^{-7}/°$ C. to about $90 \times 10^{-7}/°$ C.

In another embodiment, a glass laminate assembly includes a silicon wafer having a silicon wafer coefficient of thermal expansion ($CTE_{Si}$), the silicon wafer disposed on a glass laminate. The glass laminate includes a glass core having a core thickness ($T_{core}$) and a core coefficient of thermal expansion ($CTE_{core}$), a first glass cladding layer and a second glass cladding layer. The glass core is disposed between the first glass cladding layer and the second glass cladding layer. The first glass cladding layer has a first cladding thickness ($T_{clad1}$) and a first clad coefficient of thermal expansion ($CTE_{clad1}$), and the second glass cladding layer has a second cladding thickness ($T_{clad2}$) and a second clad coefficient of thermal expansion ($CTE_{clad2}$). The glass laminate has a laminate coefficient of thermal expansion ($CTE_L$) within a range of about $35 \times 10^{-7}/°$ C. to about $90 \times 10^{-7}/°$ C. The laminate coefficient of thermal expansion ($CTE_L$) is defined by: $CTE_L = ((CTE_{core} \times T_{core}) + (CTE_{clad1} \times T_{clad1}) + (CTE_{clad2} \times T_{clad2}))/(T_{core} + T_{clad1} + T_{clad2})$, such that the silicon wafer coefficient of thermal expansion ($CTE_{Si}$) is substantially the same as the laminate coefficient of thermal expansion ($CTE_L$).

Additional features and advantages of the apparatuses and methods for glass laminates for silicon wafer carriers described herein will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

DETAILED DESCRIPTION

Reference will now be made in detail to embodiments of glass laminates and methods of their manufacture, examples of which are illustrated in the accompanying drawings. Whenever possible the same reference numerals will be used throughout the drawings to refer to the same or like parts. Briefly referring to FIG. 5, a schematic depiction of a silicon wafer disposed on a glass laminate is illustrated. The glass laminate is used as a carrier for the silicon wafer. The glass laminate includes a core that is disposed between two cladding layers. The glass laminate is fabricated in a manner that the coefficient of thermal expansion of the glass laminate substantially matches the coefficient of thermal expansion of the silicon wafer. Silicon generally has a coefficient of thermal expansion of about $35 \times 10^{-7}/°$ C. However, the coefficient of thermal expansion of the silicon wafer after thinning may increase to about $60 \times 10^{-7}/°$ C. or more, depending on the thickness of the silicon wafer, and the various metal and metal oxide or nitride films and transistors that are coated onto the silicon wafer. In such instances, the semiconductor industry has known to require carriers having a coefficient of thermal expansion within a range of about $35 \times 10^{-7}/°$ C. to about $90 \times 10^{-7}/°$ C.

Figure 5:
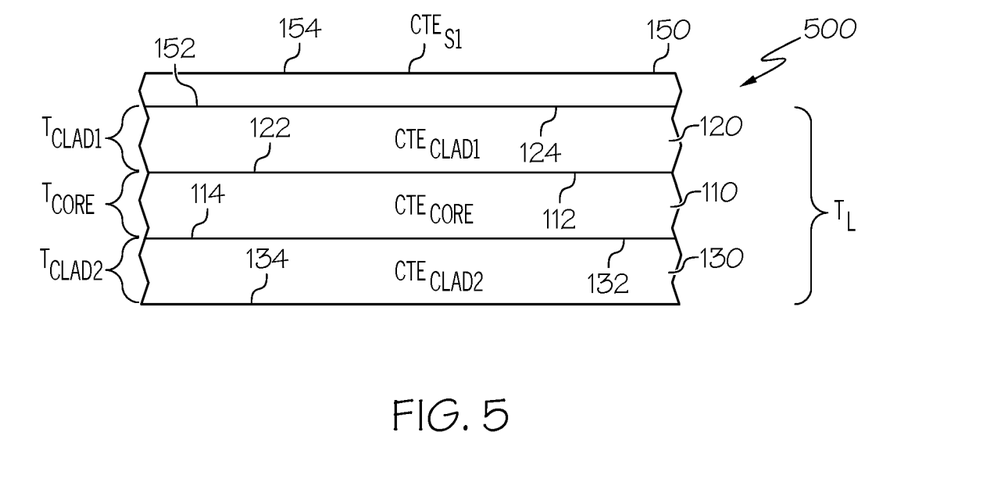
FIG. 5 is an example glass laminate assembly depicting a silicon wafer disposed on a glass laminate, according to one or more embodiments shown and described herein.

The example glass laminate assembly, as shown in FIG. 5 is constructed to have a coefficient of thermal expansion that is substantially the same as the coefficient of thermal expansion of silicon wafer that is disposed on it, after the backgrinding (thinning) is completed. As used herein, the term "substantially the same" with respect to the coefficient of thermal expansion means the coefficient of thermal expansion of the laminate is within $+/-1 \times 10^{-7}/°$ C. of the coefficient of thermal expansion of the silicon wafer, after the backgrinding (thinning) of the silicon wafer has been completed.

The coefficient of thermal expansion of the glass laminate is determined by selecting the thickness of the glass core and the glass cladding layers to obtain a coefficient of thermal expansion that is within a desired range to match the coefficient of thermal expansion of the silicon wafer. Glass laminates and methods for making the same, for silicon wafer carriers are described in more detail herein with specific reference to the appended figures.

As used herein the term "coefficient of thermal expansion" means the linear coefficient of thermal expansion at a constant pressure at a temperature between a range of 0° C. to 300° C. determined using a push-rod dilatometer in accordance with ASTM E228-11.

Figure 1:
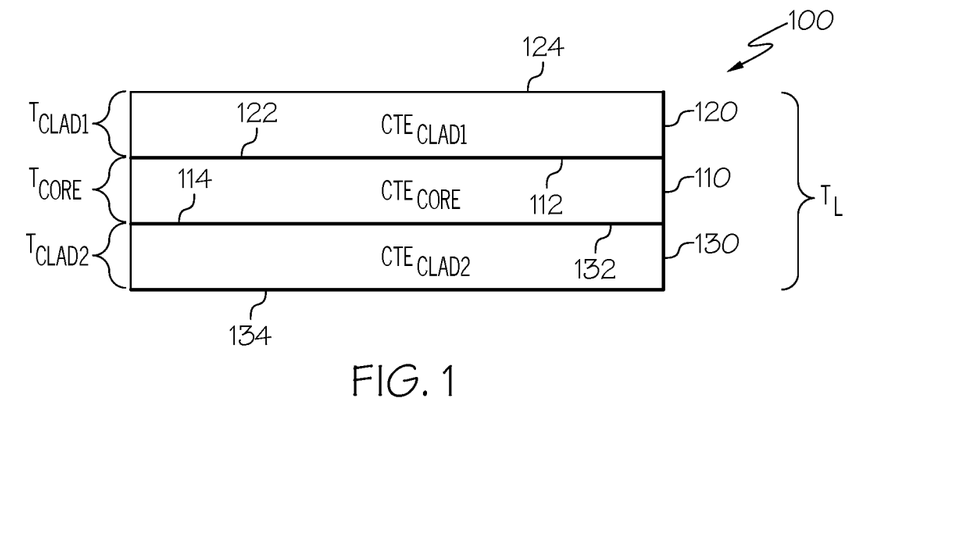
FIG. 1 illustrates an example glass laminate having a glass core, a first glass cladding layer, and a second glass cladding layer, according to one or more embodiments shown and described herein.

Referring to FIG. 1, an example glass laminate 100 is depicted. The glass laminate 100 includes a glass core 110, a first glass cladding layer 120 and a second glass cladding layer 130, such that the glass core 110 is disposed between the first glass cladding layer 120 and the second glass cladding layer 130. The glass core 110 includes a first core surface 112 and a second core surface 114, the first core surface 112 being an opposing surface to the second core surface 114. The first glass cladding layer 120 further includes a first clad surface 122 and a second clad surface 124, such that the first clad surface 122 and the second clad surface 124 are opposing surfaces. Similarly, the second glass cladding layer 130 includes a third clad surface 132 and a fourth clad surface 134, such that the third clad surface 132 and the fourth clad surface 134 are opposing surfaces. The glass core 110 is disposed between the first glass cladding layer 120 and the second glass cladding layer 130 to form a glass laminate 100. In embodiments, the first clad surface 122 of the first glass cladding layer 120 is disposed on the first core surface 112 of the glass core 110. Further, the second core surface 114 of the glass core 110 is disposed on the third clad surface 132 of the second glass cladding layer 130. As used herein, the phrase "disposed on" includes placing a glass layer (glass core 110 or glass cladding layer 120, 130) onto a surface such that the glass layer is in direct contact with the surface, or alternatively includes embodiments where the glass layer is placed on a surface with one or more intervening material(s) or interlayer(s) disposed between the glass layer and the surface.

Referring to FIG. 1, the glass laminate 100 is formed by bonding the glass core 110 to the first glass cladding layer 120 and the second glass cladding layer 130. In embodiments, bonding may be achieved by disposing an interlayer of an adhesive between the glass core 110 and the first glass cladding layer 120, and the glass core 110 and the second glass cladding layer 120. It should be understood that known or yet-to-be developed adhesives may be used. The interlayer of adhesive is disposed between the first core surface 112 of the glass core 110 on one side, and the first clad surface 122 on the other side. In some embodiments, the first clad surface 122 of the first glass cladding layer 120 is bonded to the first core surface 112 of the glass core 110 using a water bond. A water bond bonds two glass layers without the use of an adhesive at a temperature lower than a softening temperature of the glass layers. Further description regarding the water bond may be found in U.S. Appl. Pub. No. 2003/0079503, which is incorporated herein by reference. It should be understood that other known or yet-to-be developed bonding methods may also be used.

The glass laminate 100 has a laminate thickness ($T_L$), which is given by a sum of the core thickness ($T_{core}$), the first cladding thickness ($T_{clad1}$) and the second cladding thickness ($T_{clad2}$). In embodiments, the first glass cladding layer 120 and the second glass cladding layer 130 may each have equal thickness ($T_{clad1}=T_{clad2}$). In some embodiments, the first glass cladding layer 120 and the second glass cladding layer 130 may each have a different thickness ($T_{clad1} \neq T_{clad2}$) As non-limiting examples, the laminate thickness ($T_L$) is within a range of about 100 μm to about 2 mm, or about 100 μm to about 1.5 mm, or about 200 μm to about 1.2 mm. As further non-limiting examples, the laminate thickness ($T_L$) is within a range of about 400 μm to about 1 mm, or about 500 μm to about 900 μm, or about 600 μm to about 800 μm.

The glass laminate 100 has a laminate coefficient of thermal expansion ($CTE_L$) that is based on coefficients of thermal expansion of the glass core 110, the first glass cladding layer 120, and the second glass cladding layer 130. The laminate coefficient of thermal expansion is given by the Equation (1) below:

$$CTE_L = ((CTE_{core} \times T_{core}) + (CTE_{clad1} \times T_{clad1}) + (CTE_{clad2} \times T_{clad2}))/(T_{core} + T_{clad1} + T_{clad2}),$$

where $CTE_{core}$ is a coefficient of thermal expansion of the glass core 110, and $CTE_{clad1}$ and $CTE_{clad2}$ are the coefficient of thermal expansion of the first glass cladding layer and the second glass cladding layer, respectively.

As Equation (1) indicates, the coefficient of thermal expansion of the glass laminate 100 is determined by the weighted average of the core thickness ($T_{core}$), first cladding thickness ($T_{clad1}$), and the second cladding thickness ($T_{clad2}$). Equation (1) may be used to engineer a glass laminate 100 have a laminate coefficient of thermal expansion ($CTE_L$) that may be the same or substantially the same, as a coefficient of thermal expansion of a silicon wafer ($CTE_{Si}$) to be disposed on the glass laminate 100 after backgrinding, where the silicon wafer is disposed on the glass laminate 100 during the backgrinding operation.

During a process of manufacturing integrated circuits, it has been found that glass laminates that are used as carriers for composite silicon wafers preferably should have the same, or substantially the same, coefficient of thermal expansion ($CTE_L$) to the coefficient of thermal expansion of the silicon wafer ($CTE_{Si}$). This ensures similar amounts of expansion between the silicon wafer and the carrier glass laminate when the integrated circuit is subject to heat after a backgrinding process, such as subsequent solder reflow processes, and thereby prevents mechanical failure of the silicon wafer due to thermally imposed stresses. Therefore, based on the coefficient of thermal expansion of the silicon wafer ($CTE_{Si}$), the glass laminate 100 may be constructed such that the coefficient of thermal expansion of the glass laminate ($CTE_L$) may be the same, or substantially the same to the coefficient of thermal expansion of the composite of the thinned silicon wafer and the circuits on the wafer ($CTE_{Si}$). Specifically, the construction of such glass laminate 100 may be achieved by varying the core thickness ($T_{core}$) of the glass core 110 and the clad thickness ($T_{clad}$) of the glass cladding layers 120, 130, and obtaining the laminate coefficient of thermal expansion ($CTE_L$) such that it same, or substantially the same to the coefficient of thermal expansion of the silicon wafer ($CTE_{Si}$). As a non-limiting example, the coefficient of thermal expansion of the silicon wafer ($CTE_{Si}$) may be within a range of about $35 \times 10^{-7}/°$ C. to about $90 \times 10^{-7}/°$ C., and therefore, glass laminates 100 having a similar laminate coefficient of thermal expansion ($CTE_L$) are desired. In further non-limiting examples, the laminate coefficient of thermal expansion ($CTE_L$) may be within a range of about $40 \times 10^{-7}/°$ C. to about $70 \times 10^{-7}/°$ C., or about $45 \times 10^{-7}/°$ C. to about $80 \times 10^{-7}/°$ C. In some embodiments, the laminate coefficient of thermal expansion ($CTE_L$) is within a range of about $50 \times 10^{-7}/°$ C. to about $60 \times 10^{-7}/°$ C., or about $55 \times 10^{-7}/°$ C. to about $75 \times 10^{-7}/°$ C., for example. The targeted laminate coefficient of thermal expansion ($CTE_L$) is optimized to the specific circuits on the silicon wafer, for efficient backgrinding and subsequent thermal processing (solder reflow, for example) without fracture, and finally removal of the silicon wafer from the laminate glass wafer.

To obtain a laminate coefficient of thermal expansion ($CTE_L$) within a range of about $35 \times 10^{-7}/°$ C. to about $90 \times 10^{-7}/°$ C., the glass core 110 is selected such that it has a core thickness ($T_{core}$) and a core coefficient of thermal expansion ($CTE_{core}$). As non-limiting examples, the core thickness ($T_{core}$) may be selected such that it is within a range of about 0 μm to about 1.5 mm, or about 50 μm to about 1.2 mm or about 100 μm to about 1 mm. In further non-limiting examples, the core thickness ($T_{core}$) may be within a range of 500 μm to about 900 μm, or about 700 μm to about 800 μm. As non-limiting examples, the glass core 110 may be selected such that it has a core coefficient of thermal expansion ($CTE_{core}$) within a range of about $35 \times 10^{-7}/°$ C. to about $90 \times 10^{-7}/°$ C., or about $50 \times 10^{-7}/°$ C. to about $80 \times 10^{-7}/°$ C. As further non-limiting examples, the core coefficient of thermal expansion ($CTE_{core}$) may be within a range of about $60 \times 10^{-7}/°$ C. to about $70 \times 10^{-7}/°$ C. In some embodiments, the glass core 110 may be ion-exchangeable glass. Any glass having the desired coefficient of thermal expansion may be utilized as the glass core 110, such as without limitation, borosilicate glass, aluminosilicate glass, alkali-aluminosilicate glass, aluminoborosilicate, alkali-aluminoborosilicate glass, and soda lime glass. As one non-limiting example, the glass core may be fabricated from Gorilla® Glass fabricated by Corning® of Corning, N.Y. The glass core 110 may be fabricated from strengthened or unstrengthened glass.

Still referring to FIG. 1, to obtain a laminate coefficient of thermal expansion ($CTE_L$) within a range of about $35 \times 10^{-7}/°$ C. to about $90 \times 10^{-7}/°$ C., the first glass cladding layer 120 is selected such that the first cladding glass layer has a first cladding thickness ($T_{clad1}$) and a first clad coefficient of thermal expansion ($CTE_{clad1}$). The second glass cladding layer 130 is selected such that the second glass cladding layer has a second cladding thickness ($T_{clad2}$) and a second clad coefficient of thermal expansion ($CTE_{clad2}$). This is done to achieve a desired laminate coefficient of thermal expansion ($CTE_L$) in accordance with the properties of the selected glass core 110. As non-limiting examples, the first cladding thickness ($T_{clad1}$) and the second cladding thickness ($T_{clad2}$) may be selected such that it lies within a range of about 0 μm to about 1.5 mm, or about 100 μm to about 1.2 mm, or about 200 μm to about 1 mm. In further non-limiting examples, the cladding thickness ($T_{clad}$) may be within a range of about 500 μm to about 900 μm, or about 700 μm to about 800 μm.

As non-limiting examples, the first and second cladding coefficient of thermal expansion ($CTE_{clad1}$, $CTE_{clad2}$) may be selected such that each may be within a range of about $35 \times 10^{-7}/°$ C. to about $90 \times 10^{-7}/°$ C., or about $50 \times 10^{-7}/°$ C. to about $80 \times 10^{-7}/°$ C. In further non-limiting examples, the first and second cladding coefficient of thermal expansion ($CTE_{clad1}$, $CTE_{clad2}$) may be within a range of about $60 \times 10^{-7}/°$ C. to about $70 \times 10^{-7}/°$ C.

It is noted that it may be desirable that the first glass cladding layer 120 and the second glass cladding layer 130 be made of glass that is free of alkali ions. It may be advantageous to use alkali-free glass for glass cladding layers 120, 130 when the glass laminate 100 is being used as carrier for silicon wafers because alkali ions in the second clad surface 124 and fourth clad surface 134 may migrate or leach into the silicon wafer disposed on the glass laminate 100 potentially damaging the silicon wafer. The first glass cladding layer 120 and the second glass cladding layer 130 may be fabricated from borosilicate glass, aluminosilicate glass, aluminoborosilicate glass, soda lime glass and the like. A non-limiting example of alkali-free glass may be Eagle XG® fabricated by Corning® of Corning, N.Y.

Still referring to FIG. 1, the first glass cladding layer 120 and the second glass cladding layer 130 may be the same. That is, in some embodiments, the first glass cladding layer 120 and the second glass cladding layer 130 may each have the same thickness ($T_{clad}$) and the same cladding coefficient of thermal expansion ($CTE_{clad}$). In some embodiments, the first glass cladding layer 120 and the second glass cladding layer 130 may each have the same thickness ($T_{clad}$), or the same cladding coefficient of thermal expansion ($CTE_{clad}$). In some embodiments, the first glass cladding layer 120 may be different from the second glass cladding layer 130. The difference in the first glass cladding layer 120 and the second glass cladding layer 130 may be due to their thickness (i.e. $T_{clad1} \neq T_{clad2}$), or due to their coefficients of thermal expansion ($CTE_{clad1} \neq CTE_{clad2}$), or both. While such differing glass cladding layers 120, 130 may be used, the cladding thicknesses ($T_{clad1}$, $T_{clad2}$) and the cladding coefficients of thermal expansion ($CTE_{clad1}$, $CTE_{clad2}$) may be selected such that forces formed between the first glass cladding layer 120, the second glass cladding layer 130 and the glass core 110 are balanced. Such balancing of forces is desired to ensure that the glass laminate 100 does not warp when heat is applied thereto.

Figure 2:
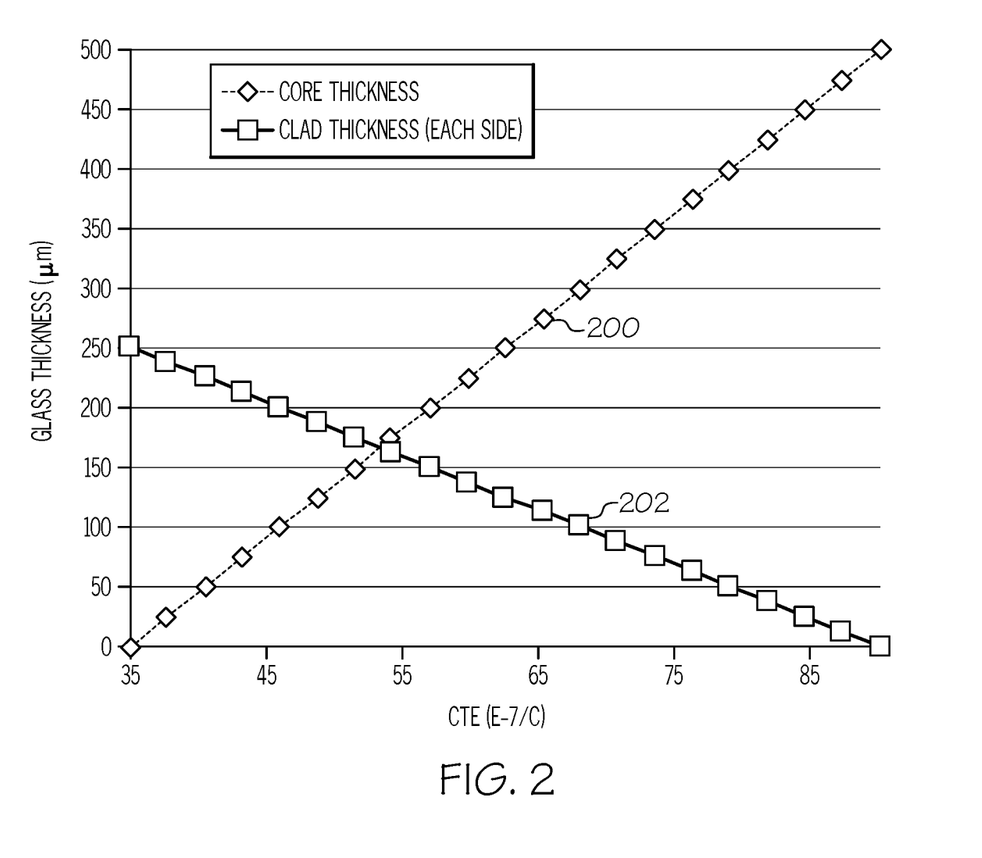
FIG. 2 is a graph depicting the change in a laminate coefficient of thermal expansion when a core thickness, a first cladding thickness and a second cladding thickness are varied and a laminate thickness is kept constant, according to one or more embodiments shown and described herein.

FIG. 2 plots the core thickness ($T_{core}$) and the first and second cladding thickness ($T_{clad1}$, $T_{clad2}$) to the resultant laminate coefficient of thermal expansion ($CTE_L$) when the overall thickness of the glass laminate ($T_L$) is held constant. Curve 200 depicts the core thickness, and curve 202 depicts cladding thickness of each glass cladding layer. Corning Eagle XG® glass is used as the glass cladding layer, and Corning Gorilla®™ glass is used as the glass core. It is observed that for the laminate thickness ($T_L$) held constant at 500 μm, the coefficient of thermal expansion for the laminate ($CTE_L$) was within a range of about 46×10$^{-7}$/° C. to about 68×10$^{-7}$/° C. For example, when the core thickness ($T_{core}$) (curve 200) is 100 μm, the cladding thickness ($T_{clad1}$, $T_{clad2}$) of each of the first glass cladding layer 120 and the second glass cladding layer 130 (curve 202) is 200 um, making the laminate thickness ($T_L$) 500 μm. In this instance, it is observed that the laminate coefficient of thermal expansion ($CTE_L$) is about 46×10$^{-7}$/° C. As another example, when the core thickness ($T_{core}$) (curve 200) is 200 μm, the cladding thickness ($T_{clad1}$, $T_{clad2}$) of each of the first glass cladding layer 120 and the second glass cladding layer 130 (curve 202) is 150 μm, making the laminate thickness ($T_L$) 500 μm. In this instance, it is observed that the laminate coefficient of thermal expansion ($CTE_L$) is about 57×10$^{-7}$/° C. In the example shown in FIG. 2, the laminate coefficient of thermal expansion ($CTE_L$) increases as the core thickness ($T_{core}$) increases. Further, the laminate coefficient of thermal expansion ($CTE_L$) decreases as the cladding thickness ($T_{clad}$) increases. In this manner, the laminate coefficient of thermal expansion ($CTE_L$) may be modified. Table 1 below shows the laminate coefficient of thermal expansion ($CTE_L$) for a given core thickness ($T_{core}$) and first and second cladding thickness ($T_{clad1}$, $T_{clad2}$) such that the laminate thickness ($T_{core}+T_{clad1}+T_{clad2}$) is 500 μm.

TABLE 1

Laminate coefficient of thermal expansion when the laminate thickness is 500 μm

| Laminate CTE ($CTE_L$) | Core thickness ($T_{core}$) μm | Cladding thickness ($T_{clad1}$, $T_{clad2}$) each side μm |
|---|---|---|
| 90 | 500 | 0 |
| 87.25 | 475 | 12.5 |
| 84.5 | 450 | 25 |
| 81.75 | 425 | 37.5 |
| 79 | 400 | 50 |
| 76.25 | 375 | 62.5 |
| 73.5 | 350 | 75 |
| 70.75 | 325 | 87.5 |
| 68 | 300 | 100 |
| 65.25 | 275 | 112.5 |
| 62.5 | 250 | 125 |
| 59.75 | 225 | 137.5 |
| 57 | 200 | 150 |
| 54.25 | 175 | 162.5 |
| 51.5 | 150 | 175 |
| 48.75 | 125 | 187.5 |
| 46 | 100 | 200 |
| 43.25 | 75 | 212.5 |
| 40.5 | 50 | 225 |
| 37.75 | 25 | 237.5 |
| 35 | 0 | 250 |

Figure 3:
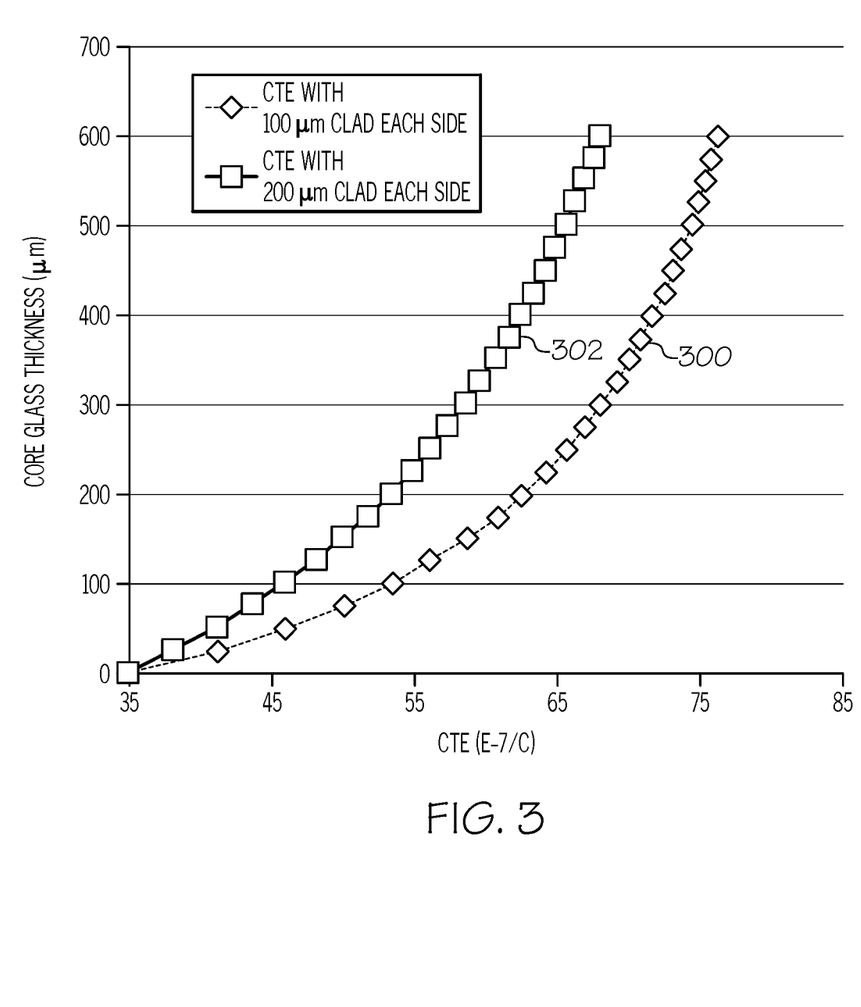
FIG. 3 is a graph depicting the change in the laminate coefficient of thermal expansion when the core thickness is varied, and the first cladding thickness and the second cladding thickness are each held constant at 100 um and 200 um, according to one or more embodiments shown and described herein.

Now referring to FIG. 3 a graph showing a variation in the laminate coefficient of thermal expansion ($CTE_L$) when the first cladding thickness ($T_{clad1}$) and the second cladding thickness ($T_{clad2}$) each are held constant and the core thickness ($T_{core}$) is varied. Corning Eagle XG® glass is used as the glass cladding layer, and Corning Gorilla®™ glass is used as the glass core. It is observed that by varying the core thickness ($T_{core}$) and keeping each cladding thickness constant ($T_{clad1}$, $T_{clad2}$), such that the laminate thickness ($T_L$) varies between 200 μm and 800 μm (the minimum core thickness ($T_{core}$) and/or the minimum cladding thickness ($T_{clad1}$, $T_{clad2}$), is each 100 μm in the present example), the laminate coefficient of thermal expansion varies between about 35×10$^{-7}$/° C. to about 76×10$^{-7}$/° C. Two sets of examples are calculated, where in a first set, the first and second cladding thickness ($T_{clad1}$, $T_{clad2}$) each is held constant at 100 μm, and the core thickness ($T_{core}$) is varied (curve 300). It can be seen that when the core thickness ($T_{core}$) is 100 μm, the laminate coefficient of thermal expansion ($T_L$) is about 53.3×10$^{-7}$/° C., and when the core thickness ($T_{core}$) is 600 μm, the laminate coefficient of thermal expansion ($CTE_L$) is about 76.2×10$^{-7}$/° C. The values of the laminate coefficient of thermal expansion ($CTE_L$) for curve 300 shown in FIG. 3 are tabulated in Table 2 below.

TABLE 2

Laminate coefficient of thermal expansion when clad thickness is 100 μm

| Laminate CTE ($CTE_L$) ×10$^{-7}$/° C. | Core thickness ($T_{core}$) μm | Clad thickness ($T_{clad1}$, $T_{clad2}$) (each side) μm |
|---|---|---|
| 76.2 | 600 | 100 |
| 75.8 | 575 | 100 |
| 75.3 | 550 | 100 |
| 74.8 | 525 | 100 |
| 74.2 | 500 | 100 |

TABLE 2-continued

Laminate coefficient of thermal expansion
when clad thickness is 100 μm

| Laminate CTE $(CTE_L) \times 10^{-7}/°$ C. | Core thickness $(T_{core})$ μm | Clad thickness $(T_{clad1}, T_{clad2})$ (each side) μm |
|---|---|---|
| 73.7 | 475 | 100 |
| 73.0 | 450 | 100 |
| 72.4 | 425 | 100 |
| 71.6 | 400 | 100 |
| 70.8 | 375 | 100 |
| 70 | 350 | 100 |
| 69.0 | 325 | 100 |
| 68 | 300 | 100 |
| 66.8 | 275 | 100 |
| 65.5 | 250 | 100 |
| 64.1 | 225 | 100 |
| 62.5 | 200 | 100 |
| 60.6 | 175 | 100 |
| 58.5 | 150 | 100 |
| 56.1 | 125 | 100 |
| 53.3 | 100 | 100 |
| 50 | 75 | 100 |
| 46 | 50 | 100 |
| 41.1 | 25 | 100 |
| 35 | 0 | 100 |

Further, in the second example of FIG. 3, the first cladding thickness ($T_{clad1}$) and the second cladding thickness ($T_{clad2}$) each is held constant at 200 μm and the core thickness ($T_{core}$) is varied (curve 302). It can be seen that when the core thickness ($T_{core}$) is 100 μm, the laminate coefficient of thermal expansion ($CTE_L$) is about $46 \times 10^{-7}/°$ C. In another instance, when the core thickness ($T_{core}$) is 600 μm, the laminate coefficient of thermal expansion ($CTE_L$) is about $68 \times 10^{-7}/°$ C. Table 3 below shows the laminate coefficient of thermal expansion ($CTE_L$) for a varying core thickness ($T_{core}$) when each of the first and second cladding thickness ($T_{clad1}$, $T_{clad2}$) is held constant at 200 μm as shown in curve 302.

TABLE 3

Laminate coefficient of thermal expansion
when clad thickness is 200 μm

| Laminate CTE $(CTE_L) \times 10^{-7}/°$ C. | Core thickness $(T_{core})$ μm | Clad thickness $(T_{clad1}, T_{clad2})$ (each side) μm |
|---|---|---|
| 68 | 600 | 200 |
| 67.4 | 575 | 200 |
| 66.8 | 550 | 200 |
| 66.2 | 525 | 200 |
| 65.5 | 500 | 200 |
| 64.8 | 475 | 200 |
| 64.1 | 450 | 200 |
| 63.3 | 425 | 200 |
| 62.5 | 400 | 200 |
| 61.6 | 375 | 200 |
| 60.6 | 350 | 200 |
| 59.6 | 325 | 200 |
| 58.5 | 300 | 200 |
| 57.4 | 275 | 200 |
| 56.1 | 250 | 200 |
| 54.8 | 225 | 200 |
| 53.3 | 200 | 200 |
| 51.7 | 175 | 200 |
| 50 | 150 | 200 |
| 48.0 | 125 | 200 |
| 46 | 100 | 200 |
| 43.6 | 75 | 200 |
| 41.1 | 50 | 200 |

TABLE 3-continued

Laminate coefficient of thermal expansion
when clad thickness is 200 μm

| Laminate CTE $(CTE_L) \times 10^{-7}/°$ C. | Core thickness $(T_{core})$ μm | Clad thickness $(T_{clad1}, T_{clad2})$ (each side) μm |
|---|---|---|
| 38.2 | 25 | 200 |
| 35 | 0 | 200 |

Figure 4:
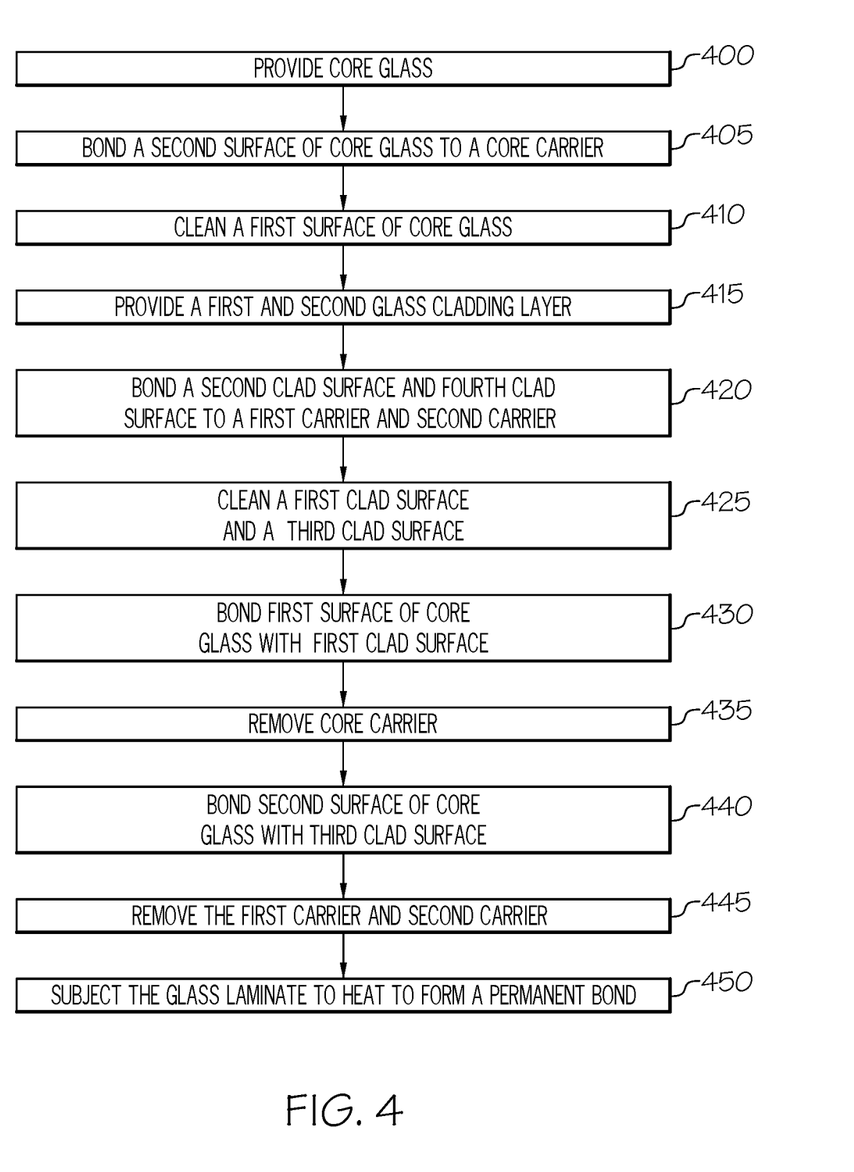
FIG. 4 is a flowchart depicting an example method of making a glass laminate, according to one or more embodiments shown and described herein.

FIG. 4 depicts a flowchart of an example method of manufacturing a glass laminate 100. Referring to FIGS. 1 and 4, at block 400, a glass core 110 is provided. The glass core 110 includes a first core surface 112 and a second core surface 114, the first core surface 112 being an opposing surface to the second core surface 114. Further, the glass core 110 is selected such that the glass core 110 has a core thickness ($T_{core}$), and a core coefficient of thermal expansion ($CTE_{core}$).

At block 405, the second core surface 114 of the glass core 110 is bonded to a core carrier. A carrier is a substrate that may be used as a base to facilitate precise bonding of glass layers to form the glass laminate 100. In embodiments, the second core surface 114 of the glass core 110 may be temporarily bonded to the core carrier. Temporary bonding may be achieved by using attachment members that can be de-attached at a later time, without any damage to the glass core 110. For example, in one embodiment, the core carrier may be temporarily bonded to the second core surface 114 of the glass core 110 using means known in the art including, but not limited to, with an adhesive, or relying on Van der Waal forces. Further, at block 410, the first core surface 112 of the glass core 110 is cleaned to remove any foreign particles or impurities on the glass core 110. The first core surface 112 may be cleaned with cleaning agents. Non-limiting examples of cleaning agents include detergents known to the display industry, brush washing, ultrasonic or megasonic agitated washing. In embodiments, the core thickness ($T_{core}$) of the glass core 110 may be reduced by thinning the glass core 110 using acid etching or polishing, after bonding the second core surface 114 to the core carrier, and before removing the glass core 110 from the core carrier.

Referring still to FIGS. 1 and 4, at block 415 a first glass cladding layer 120 and a second glass cladding layer 130 are provided. The first glass cladding layer 120 further includes a first clad surface 122 and a second clad surface 124, such that the first clad surface 122 and the second clad surface 124 are opposing surfaces. Similarly, the second glass cladding layer 130 includes a third clad surface 132 and a fourth clad surface 134, such that the third clad surface 132 and the fourth clad surface 134 are opposing surfaces. The first glass cladding layer 120 and the second glass cladding layer 130 are selected such that each glass cladding layer 120, 130 has a desired cladding thickness ($T_{clad}$) and a desired cladding coefficient of thermal expansion ($CTE_{clad}$). In some embodiments, the first glass cladding layer 120 and the second glass cladding layer 130 may each have the same thickness ($T_{clad}$) and the same cladding coefficient of thermal expansion ($CTE_{clad}$). In embodiments, the first glass cladding layer 120 and the second glass cladding layer 130 may each have the same thickness ($T_{clad}$) or the same cladding coefficient of thermal expansion ($CTE_{clad}$). In other embodiments, the first glass cladding layer 120 and the second glass cladding layer 130 may be different, thereby having different thicknesses (i.e. $T_{clad1} \neq T_{clad2}$), and/or different coefficients of thermal expansion ($CTE_{clad1} \neq CTE_{clad2}$).

At block 420, the second clad surface 124 of the first glass cladding layer 120 is bonded to a first carrier. Further, the fourth clad surface 134 of the second glass cladding layer 130 is bonded to a second carrier. The first carrier and the second carrier may be similar to the core carrier described above. In embodiments, the second clad surface 124 and the fourth clad surface 134 may be temporarily bonded to the first carrier and second carrier respectively. Temporary bonding may be achieved by using means known in the art including, but not limited to, with an adhesive, or relying on Van der Waal forces that can be de-attached at a later time, without any damage to the first glass cladding layer 120 and the second glass cladding layer 130. The first cladding glass layer 120 and the second cladding glass layer 130 may be subject to on by acid etching or polishing after bonding the first glass cladding layer 120 to the first carrier, and the second glass cladding layer 130 to the second carrier. Thinning of the first and second cladding glass layers 120, 130 may be performed to achieve a desired first cladding thickness ($T_{clad1}$) and second cladding thickness ($T_{clad2}$). In embodiments, thinning may be performed on the first cladding layer 120 and the second cladding layer 130 after the glass laminate 100 has been assembled.

Further, at block 425, the first clad surface 122 of the first glass cladding layer 120, and the third clad surface 132 of the second glass cladding layer are cleaned. As an example, and not as a limitation, the first clad surface 122 is cleaned while the first glass cladding layer 120 is bonded to the first carrier. Similarly, the third clad surface 132 may be cleaned while the second glass cladding layer 130 is bonded to the second carrier. The first clad surface 122 and the third clad surface 132 may be cleaned in a manner similar to the cleaning of the first core surface 112 of the glass core 110, described above.

At block 430 the first core surface 112 of the glass core 110 is bonded to the first clad surface 122 of the first glass cladding layer 120. Bonding may be achieved by disposing an interlayer of an adhesive between the first core surface 112 of the glass core 110 and the first clad surface 122. Example of some adhesives include but are not limited to, polyvinyl butyral (PVB), ethylene-vinyl acetate (EVA), thermoset ethylene-vinyl acetate (EVA) and thermoplastic polyurethane (TPU). The interlayer of adhesive is disposed between the first core surface 112 of the glass core 110 on one side, and the first clad surface 122 on the other side. The glass core 110 and the first glass cladding layer 120 may be then passed through a series of rollers, vacuum bagging systems, ovens, or autoclaves to expel any air pockets. In some embodiments, the first clad surface 122 of the first glass cladding layer 120 is bonded to the first core surface 112 of the glass core 110 using a water bond (i.e., without an adhesive at a temperature lower than the softening temperature of the glass layers). It should be understood that other known or yet to be developed bonding methods may also be used.

At block 435, the core carrier is removed from the second core surface 114 of the glass core 110. For example, in one embodiment, the clamps used to attach the glass core 110 to the core carrier are dethatched.

At block 440, the second core surface 114 of the glass core 110 is bonded to the third clad surface 132 of second glass cladding layer 130. Bonding may be achieved by disposing an interlayer of an adhesive between the second core surface 114 of the glass core 110 and the third clad surface 132. Example of some adhesives include but are not limited to, polyvinyl butyral (PVB), ethylene-vinyl acetate (EVA), thermoset ethylene-vinyl acetate (EVA) and thermoplastic polyurethane (TPU). The interlayer of adhesive is sandwiched between the second core surface 114 of the glass core 110 on one side, and the third clad surface 132 on the other side. The glass core 110 (which is already bonded to the first glass cladding layer 120) and the second glass cladding layer 130 may be then passed through a series of rollers, vacuum bagging systems, ovens, or autoclaves to expel any air pockets. In some embodiments, the third clad surface 132 of the second glass cladding layer 130 is bonded to the second core surface 114 of the glass core 110 using a water bond (i.e., without an adhesive at a temperature lower than the softening temperature of the glass layers). It should be understood that other known or yet-to-be developed bonding methods may also be used. At block 445, the first carrier is removed from the second clad surface 124 of the first glass cladding layer 120 after the first clad surface 122 is bonded to the first core surface 112 of the glass core 110. Similarly, the second carrier is removed from the fourth clad surface 134 of the second glass cladding layer 130 after the third clad surface 132 is bonded to the second core surface 114 of the glass core 110. Removal of the first carrier and the second carrier results in the glass laminate 100, as shown in FIG. 1.

Referring now to FIG. 4, at block 450, the glass laminate 100 may optionally be subjected to an additional heat to ensure permanent bonding between the surfaces of the glass core 110, the first glass cladding layer 120 and the second glass cladding layer 130. In embodiments, the glass laminate 100 may be subjected to heat under pressure in an autoclave. Other types of apparatuses, such as ovens, or vacuum bagging systems may also be used. As an example and not a limitation, the heat may be applied in a temperature range of 100° C. to about 500° C.

Referring now to FIG. 5, a glass laminate assembly 500 is shown. The glass laminate assembly 500 includes a silicon wafer 150 disposed on a glass laminate 100. The silicon wafer 150 has a silicon wafer coefficient of thermal expansion ($CTE_{Si}$). The silicon wafer 150 has a first silicon surface 152 and a second silicon surface 154, the first silicon surface 152 and the second silicon surface 154 being opposing surfaces. The first silicon surface 152 is disposed on the glass laminate 100. The glass laminate 100 comprises a glass core 110, having a core thickness ($T_{core}$) and a core coefficient of thermal expansion ($CTE_{core}$). The glass core 110 is disposed between a first glass cladding layer 120 and a second glass cladding layer 130. Each glass cladding layer 120, 130 includes a cladding thickness ($T_{clad}$) and a cladding coefficient of thermal expansion ($CTE_{clad}$). The laminate coefficient of thermal expansion ($CTE_L$) is defined by Equation (1), such that the laminate coefficient of thermal expansion ($CTE_L$) is within a range of about $35 \times 10^{-7}$/° C. to about $90 \times 10^{-7}$/° C. Further, the silicon wafer 150 disposed on the glass laminate 100 having the silicon wafer coefficient of thermal expansion ($CTE_{Si}$) which is substantially the same as the laminate coefficient of thermal expansion ($CTE_L$). This ensures similar amounts of expansion between the silicon wafer and the carrier glass laminate when the integrated circuit is subject to heat, and thereby prevents mechanical fracture of the silicon wafer and circuits there upon.

It should now be understood that a glass laminate includes a glass core disposed between two glass cladding layers. A laminate coefficient of thermal expansion ($CTE_L$) may be adjusted by adjusting a core thickness ($T_{core}$) of the glass core and a first and second cladding thickness ($T_{clad1}$, $T_{clad2}$) of the glass laminate such that a desired laminate coefficient of thermal expansion may be obtained. Specifically, laminate coefficient of thermal expansion may be designed to be within a range of about $35\times10^{-7}/°$ C. to about $90\times10^{-7}/°$ C. so that the laminate coefficient of thermal expansion is substantially the same as a silicon wafer coefficient of thermal expansion that is disposed on the glass laminate.

In a first aspect, a glass laminate comprises: a glass core having a core thickness ($T_{core}$) and a core coefficient of thermal expansion ($CTE_{core}$); a first glass cladding layer having a first cladding thickness ($T_{clad1}$) and a first clad coefficient of thermal expansion ($CTE_{clad1}$); and a second glass cladding layer having a second cladding thickness ($T_{clad2}$) and a second clad coefficient of thermal expansion ($CTE_{clad2}$), wherein: the glass core is disposed between the first glass cladding layer and the second glass cladding layer; and the glass laminate has a laminate coefficient of thermal expansion ($CTE_L$) within a range of about $35\times10^{-7}/°$ C. to about $90\times10^{-7}/°$ C., the laminate coefficient of thermal expansion ($CTE_L$) defined by: $CTE_L=((CTE_{core}\times T_{core})+(CTE_{clad1}\times T_{clad1})+(CTE_{clad2}\times T_{clad2}))/(T_{core}+T_{clad1}+T_{clad2})$.

A second aspect according to the first aspect, wherein a laminate thickness ($T_L$) is within a range of about 100 μm to about 1.5 mm, the laminate thickness ($T_L$) being a sum of the core thickness ($T_{core}$), the first cladding thickness ($T_{clad1}$), and the second cladding thickness ($T_{clad2}$).

A third aspect according to the first or second aspect, wherein the first cladding thickness ($T_{clad1}$) and the second cladding thickness ($T_{clad2}$) are the same.

A fourth aspect according to any preceding aspect, wherein the first clad coefficient of thermal expansion ($CTE_{clad1}$) and the second clad coefficient of thermal expansion ($CTE_{clad2}$) are the same.

A fifth aspect according to the first, second, or fourth aspect, wherein the first cladding thickness ($T_{clad1}$) and the second cladding thickness ($T_{clad2}$) are different.

A sixth aspect according to the first, second, third, or fifth aspect, wherein the first clad coefficient of thermal expansion ($CTE_{clad1}$) and the second clad coefficient of thermal expansion ($CTE_{clad2}$) are different.

A seventh aspect according to any of the preceding aspects, wherein the core thickness ($T_{core}$), the first cladding thickness ($T_{clad1}$) and the second cladding thickness ($T_{clad2}$) each is within a range of above 0 μm to about 1.5 mm.

An eighth aspect according to any of the preceding aspects, wherein the core coefficient of thermal expansion ($CTE_{core}$) is higher than the first cladding coefficient of thermal expansion ($CTE_{clad1}$) and the second cladding coefficient of thermal expansion ($CTE_{clad2}$).

In a ninth aspect, a method of making a glass laminate, the glass laminate having a laminate coefficient of thermal expansion ($CTE_L$), the method comprises: bonding a first core surface of a glass core with a first clad surface of a first glass cladding layer; and bonding a second core surface of the glass core with a third clad surface of a second glass cladding layer to form the glass laminate, wherein: the glass core has a core thickness ($T_{core}$) and a core coefficient of thermal expansion ($CTE_{core}$); the first glass cladding layer has a first cladding thickness ($T_{clad1}$) and a first clad coefficient of thermal expansion ($CTE_{clad1}$); the second glass cladding layer having a second cladding thickness ($T_{clad2}$) and a second clad coefficient of thermal expansion ($CTE_{clad2}$); the laminate coefficient of thermal expansion ($CTE_L$) is defined by: $CTE_L=((CTE_{core}\times T_{core})+(CTE_{clad1}\times T_{clad1})+(CTE_{clad2}\times T_{clad2}))/(T_{core}+T_{clad1}+T_{clad2})$; and the core thickness ($T_{core}$), the core coefficient of thermal expansion ($CTE_{core}$), the first cladding thickness ($T_{clad1}$), the first clad coefficient of thermal expansion ($CTE_{clad1}$), the second cladding thickness ($T_{clad2}$) and the second clad coefficient of thermal expansion ($CTE_{clad2}$) are such that the laminate coefficient of thermal expansion ($CTE_L$) is within a range of about $35\times10^{-7}/°$ C. to about $90\times10^{-7}/°$ C.

A tenth aspect according to the ninth aspect, further comprising: cleaning the first core surface and the second core surface of the glass core; and cleaning the first clad surface of the first glass cladding layer and the third clad surface of the second glass cladding layer; wherein the first core surface and the second core surface, the first clad surface layer and the third clad surface are cleaned before bonding the glass core with the first glass cladding layer and the second glass cladding layer.

An eleventh aspect according to the ninth or tenth aspect further comprising: bonding the second core surface of the glass core to a core carrier prior to cleaning the first core surface of the glass core; and removing the glass core from the core carrier before cleaning the second core surface of the glass core.

A twelfth aspect according to the eleventh aspect further comprising thinning the core thickness ($T_{core}$) of the glass core by acid etching or polishing after bonding the second core surface of the glass core to the core carrier, and before removing the glass core from the core carrier.

A thirteenth aspect according to any one of the ninth through twelfth aspects, wherein the first cladding thickness ($T_{clad1}$) and the second cladding thickness ($T_{clad2}$) are the same, and the first clad coefficient of thermal expansion ($CTE_{clad1}$) and the second clad coefficient of thermal expansion ($CTE_{clad2}$) are the same.

A fourteenth aspect according to any one of the ninth through thirteenth aspects, further comprising: bonding a second clad surface of the first glass cladding layer to a first carrier; and bonding a fourth clad surface of the second glass cladding layer to a second carrier.

A fifteenth aspect according to the fourteenth aspect, further comprising: removing the first carrier after the first glass cladding layer is bonded to the glass core; and removing the second carrier after the second glass cladding layer is bonded to the glass core to form the glass laminate.

A sixteenth aspect according to the fourteenth or fifteenth aspect, further comprising thinning the first glass cladding layer and the second glass cladding layer by acid etching or polishing after bonding the first glass cladding layer to the first carrier and the second glass cladding layer to the second carrier.

A seventeenth aspect according to any one of the ninth through sixteenth aspects, further comprising: bonding the first glass cladding layer and the second glass cladding layer to the glass core without adhesive at a temperature lower than a softening temperature of the first and second glass cladding layers and the glass core; and subjecting the glass laminate to heat to form a permanent bond between the first glass cladding layer and the glass core and between the second glass cladding layer and the glass core.

An eighteenth aspect according to any one of the ninth through seventeenth aspects, wherein the glass core is non ion-exchanged glass, and the first glass cladding layer and the second glass cladding layer are each alkali-free glass.

In a nineteenth aspect, a glass laminate assembly comprises: a silicon wafer having a silicon wafer coefficient of thermal expansion ($CTE_{Si}$), the silicon wafer disposed on a glass laminate, the glass laminate comprising: a glass core having a core thickness ($T_{core}$) and a core coefficient of thermal expansion ($CTE_{core}$); a first glass cladding layer having a first cladding thickness ($T_{clad1}$) and a first clad coefficient of thermal expansion ($CTE_{clad1}$); and a second glass cladding layer having a second cladding thickness ($T_{clad2}$) and a second clad coefficient of thermal expansion ($CTE_{clad2}$), wherein: the glass core is disposed between the first glass cladding layer and the second glass cladding layer; and the glass laminate has a laminate coefficient of thermal expansion ($CTE_L$) within a range of about $35 \times 10^{-7}/°$ C. to about $90 \times 10^{-7}/°$ C., the laminate coefficient of thermal expansion ($CTE_L$) is defined by: $CTE_L=((CTE_{core} \times T_{core})+(CTE_{clad1} \times T_{clad1})+(CTE_{clad2} \times T_{clad2}))/(T_{core}+T_{clad1}+T_{clad2})$; wherein the silicon wafer coefficient of thermal expansion ($CTE_{Si}$) is substantially the same as the laminate coefficient of thermal expansion ($CTE_L$).

A twentieth aspect according to the nineteenth aspect, wherein the core coefficient of thermal expansion ($CTE_{core}$) is higher than the cladding coefficient of thermal expansion ($CTE_{clad}$).

It will be apparent to those skilled in the art that various modifications and variations can be made to the embodiments described herein without departing from the spirit and scope of the claimed subject matter. Thus it is intended that the specification cover the modifications and variations of the various embodiments described herein provided such modification and variations come within the scope of the appended claims and their equivalents.

The invention claimed is:

1. A glass laminate assembly comprising:
    a glass core having a core thickness ($T_{core}$) and a core coefficient of thermal expansion ($CTE_{core}$) within a range of about $50 \times 10^{-7}/°$ C. to about $80 \times 10^{-7}/°$ C.;
    a first glass cladding layer having a first cladding thickness ($T_{clad1}$) and a first clad coefficient of thermal expansion ($CTE_{clad1}$); and
    a second glass cladding layer having a second cladding thickness ($T_{clad2}$) and a second clad coefficient of thermal expansion ($CTE_{clad2}$), wherein:
        the glass core is disposed between the first glass cladding layer and the second glass cladding layer; and
        the glass laminate has a laminate coefficient of thermal expansion ($CTE_L$) within a range of about $40 \times 10^{-7}/°$ C. to about $70 \times 10^{-7}/°$ C., the laminate coefficient of thermal expansion ($CTE_L$) defined by:

$CTE_L=((CTE_{core} \times T_{core})+(CTE_{clad1} \times T_{clad1})+(CTE_{clad2} \times T_{clad2}))/(T_{core}+T_{clad1}+T_{clad2})$; and further comprising a silicon wafer disposed on the first cladding layer,
    wherein a silicon wafer coefficient of thermal expansion ($CTE_{Si}$) is within a range of about $35 \times 10^{-7}/°$ C. to about $90 \times 10^{-7}/°$ C.

2. The glass laminate assembly of claim 1, wherein a laminate thickness ($T_L$) is within a range of about 100 µm to about 1.5 mm, the laminate thickness ($T_L$) being a sum of the core thickness ($T_{core}$), the first cladding thickness ($T_{clad1}$), and the second cladding thickness ($T_{clad2}$).

3. The glass laminate assembly of claim 1, wherein the first cladding thickness ($T_{clad1}$) and the second cladding thickness ($T_{clad2}$) are the same.

4. The glass laminate assembly of claim 1, wherein the first clad coefficient of thermal expansion ($CTE_{clad1}$) and the second clad coefficient of thermal expansion ($CTE_{clad2}$) are the same.

5. The glass laminate assembly of claim 1, wherein the first cladding thickness ($T_{clad1}$) and the second cladding thickness ($T_{clad2}$) are different.

6. The glass laminate assembly of claim 1, wherein the first clad coefficient of thermal expansion ($CTE_{clad1}$) and the second clad coefficient of thermal expansion ($CTE_{clad2}$) are different.

7. The glass laminate assembly of claim 1, wherein the core thickness ($T_{core}$), the first cladding thickness ($T_{clad1}$) and the second cladding thickness ($T_{clad2}$) each is within a range of greater than 0 µm to about 1.5 mm.

8. The glass laminate assembly claim 1, wherein the core coefficient of thermal expansion ($CTE_{core}$) is higher than the first cladding coefficient of thermal expansion ($CTE_{clad1}$) and the second cladding coefficient of thermal expansion ($CTE_{clad2}$).

9. A glass laminate comprising:
    a glass core having a core thickness ($T_{core}$) and a core coefficient of thermal expansion ($CTE_{core}$) within a range of about $50 \times 10^{-7}/°$ C. to about $80 \times 10^{-7}/°$ C.;
    a first glass cladding layer having a first cladding thickness ($T_{clad1}$) and a first clad coefficient of thermal expansion ($CTE_{clad1}$); and
    a second glass cladding layer having a second cladding thickness ($T_{clad2}$) and a second clad coefficient of thermal expansion ($CTE_{clad2}$), wherein:
        the glass core is disposed between the first glass cladding layer and the second glass cladding layer; and
        the glass laminate has a laminate coefficient of thermal expansion ($CTE_L$) within a range of about $45 \times 10^{-7}/°$ C. to about $80 \times 10^{-7}/°$ C., the laminate coefficient of thermal expansion ($CTE_L$) defined by:

$CTE_L=((CTE_{core} \times T_{core})+(CTE_{clad1} \times T_{clad1})+(CTE_{clad2} \times T_{clad2}))/(T_{core}+T_{clad1}+T_{clad2})$.

* * * * *

UNITED STATES PATENT AND TRADEMARK OFFICE
CERTIFICATE OF CORRECTION

| | |
|---|---|
| PATENT NO. | : 11,529,792 B2 |
| APPLICATION NO. | : 16/096187 |
| DATED | : December 20, 2022 |
| INVENTOR(S) | : David Francis Dawson-Elli |

It is certified that error appears in the above-identified patent and that said Letters Patent is hereby corrected as shown below:

On the Title Page

Item (57), in Column 2, in "Abstract", Line 3, delete "C one" and insert -- one --.

In the Claims

In Column 16, Line 24, in Claim 8, before "claim 1," insert -- of --.

Signed and Sealed this
Twenty-first Day of March, 2023

Katherine Kelly Vidal
*Director of the United States Patent and Trademark Office*